United States Patent [19]

Schwarzbich

[11] Patent Number: 5,769,491
[45] Date of Patent: Jun. 23, 1998

[54] SEAT WITH ADJUSTABLE SUPPORT ELEMENTS

[76] Inventor: Jörg Schwarzbich, Wertherstr. 15, D-33615 Bielefeld, Germany

[21] Appl. No.: 757,634

[22] Filed: Dec. 2, 1996

[30] Foreign Application Priority Data

Dec. 23, 1995 [EP] European Pat. Off. ............ 95 120 619

[51] Int. Cl.⁶ ...................................................... B60N 2/44
[52] U.S. Cl. .................... 297/284.4; 24/339; 297/452.52
[58] Field of Search ............................. 297/284.4, 284.7, 297/452.52, 452.55; 24/336, 339

[56] References Cited

U.S. PATENT DOCUMENTS

| | | | |
|---|---|---|---|
| 3,231,076 | 1/1966 | Freemn .................................. | 24/336 X |
| 4,316,631 | 2/1982 | Lenz et al. . | |
| 4,826,114 | 5/1989 | Umehara ............................... | 24/339 X |
| 4,900,184 | 2/1990 | Cleveland ............................. | 24/339 X |
| 5,217,278 | 6/1993 | Harrison et al. . | |
| 5,409,198 | 4/1995 | Roich ..................................... | 24/336 X |
| 5,518,294 | 5/1996 | Ligon, Sr. et al. .................. | 297/284.4 |

FOREIGN PATENT DOCUMENTS

| | | |
|---|---|---|
| 0 518 830 | 12/1992 | European Pat. Off. . |
| 0 537 839 | 4/1993 | European Pat. Off. . |
| 44 05 495 | 8/1995 | Germany . |

*Primary Examiner*—Peter R. Brown
*Attorney, Agent, or Firm*—Burns, Doane, Swecker & Mathis, L.L.P.

[57] ABSTRACT

A vehicle seat includes a back rest with lordosis support comprised of a bendable supporting element mounted on a wire grating by means of clamps carried by the supporting element. Each clamp forms a slot having a central tongue dividing the slot into first and second compartments for receiving first and second wires, respectively, of the grating. The combined widths of mouths of the two compartments is less than the combined diameters of the two wires so that the two wires cannot be inserted or removed simultaneously. The tongue is flexible to enable the two wires to be inserted or removed sequentially.

10 Claims, 2 Drawing Sheets

(12)

SEAT WITH ADJUSTABLE SUPPORT ELEMENTS

BACKGROUND OF THE INVENTION

The invention relates to a seat, such as a vehicle seat having an adjustable lumbar support, and particularly to a device for fastening a supporting element onto a wire grating of the seat back.

Seats, in particular motor vehicle seats, frequently have a supporting element in the shape of a so-called lordosis support inside the seat back, below the upholstery, which can be curved more or less with the aid of a fastening device in order to provide the user a better hold in the seat, in the area of the lumbar vertebra. The supporting element for the most part is shaped like an elongated plate made of plastic, which can be stressed to compress in a vertical direction with the aid of a conventional Bowden pull (i.e., a cable assembly having relatively movable telescoping cables), so that it curves (bends) and forms a forwardly facing convex surface. This plate is clamped to a wire grating, which itself is suspended flexibly by springs from the frame of the seat back.

A simple lock-in connection of the supporting element can easily disengage itself from the wire grating as a result of mechanical stresses, for example during assembling of the seat or as a result of the pulling forces that occur during the bending. If, on the other hand, the clamping force is increased to secure the supporting elements better to the wire grating, then it becomes increasingly more difficult to lock the wires to the supporting element, resulting in increased operational expenditure during the assembly of the lordosis support.

It is an object of the invention to design a device of the aforementioned type, which makes it easy to attach the supporting element to the wire grating easily and with little operational expenditure and which, on the other hand, exhibits high stability so that the supporting elements cannot be torn from the wire grating following the locking in place, even if subjected to high mechanical stresses.

SUMMARY OF THE INVENTION

This task is solved according to the invention wherein a seat includes a wire grating and a support element mounted on wires of the grating. The support element carries clamps. Each clamp includes a slot having a mouth for receiving two wires of the grating in a direction of wire insertion/removal. That direction extends generally perpendicular to a length of the wires. A clear width of the mouth measured generally perpendicular to the wire length is greater than a diameter of each of the two wires and is less than a sum of the diameters of the two wires, to permit sequential insertion and removal of the two wires while preventing simultaneous insertion and removal of the two wires.

With the present invention, the slot of each clamp holds two wires of the wire grating. The effective width of the opening of the slot is smaller than double the wire diameter.

If the supporting element is to be fastened to the wire grating, the two wires are pushed successively into the clamp. The resistance to engagement that occurs during this procedure is relatively low and can be overcome without problems. This permits a simple assembly.

Once the supporting element is fastened to the wire grating and a pull is exercised on the supporting element, in a direction that is perpendicular to the plane of the wire grating, then this causes a movement of the supporting element relative to both wires of the wire grating, which are in the clamp. The two wires therefore have a tendency to leave the narrowed opening of the clamp simultaneously. However, because the clear width of the slot mouth is smaller than twice the wire diameter, this is a reliable way to prevent a pulling of the wires from the clamp. In this way, the desired high stability for fastening is achieved.

When the supporting element is to be detached from the wire grating, during repair operations, the fastening can be detached easily by pulling the wires one after another from the clamp.

Preferably, an elastic tongue is arranged inside the clamp slot, which tongue projects from an end of the clamp and extends into the narrowed opening of the clamp slot. The clamp slot is thus divided into two compartments, which hold one wire each. If the wires are engaged one after the other or pulled from the clamp set, the tongue can move respectively to one side. If, on the other hand, a pull is exercised on the supporting element whereby the two wires have a tendency to leave the opening or mouth of the clamp slot at the same time, then the tongue is prevented from moving aside so that the two wires jam tightly inside that mouth. The total width of the mouth, measured from wall to wall, in this case can be greater than double the wire diameter. The term "clear width" or "effective width" of the slot mouth means the total width less the width of the tongue.

BRIEF DESCRIPTION OF THE DRAWING

The objects and advantages of the invention will become apparent from the following detailed description of a preferred embodiment thereof in connection with the accompanying drawing in which like numerals designate like elements, and in which.

DETAILED DESCRIPTION OF A PREFERRED EMBODIMENT OF THE INVENTION

Figure 1:
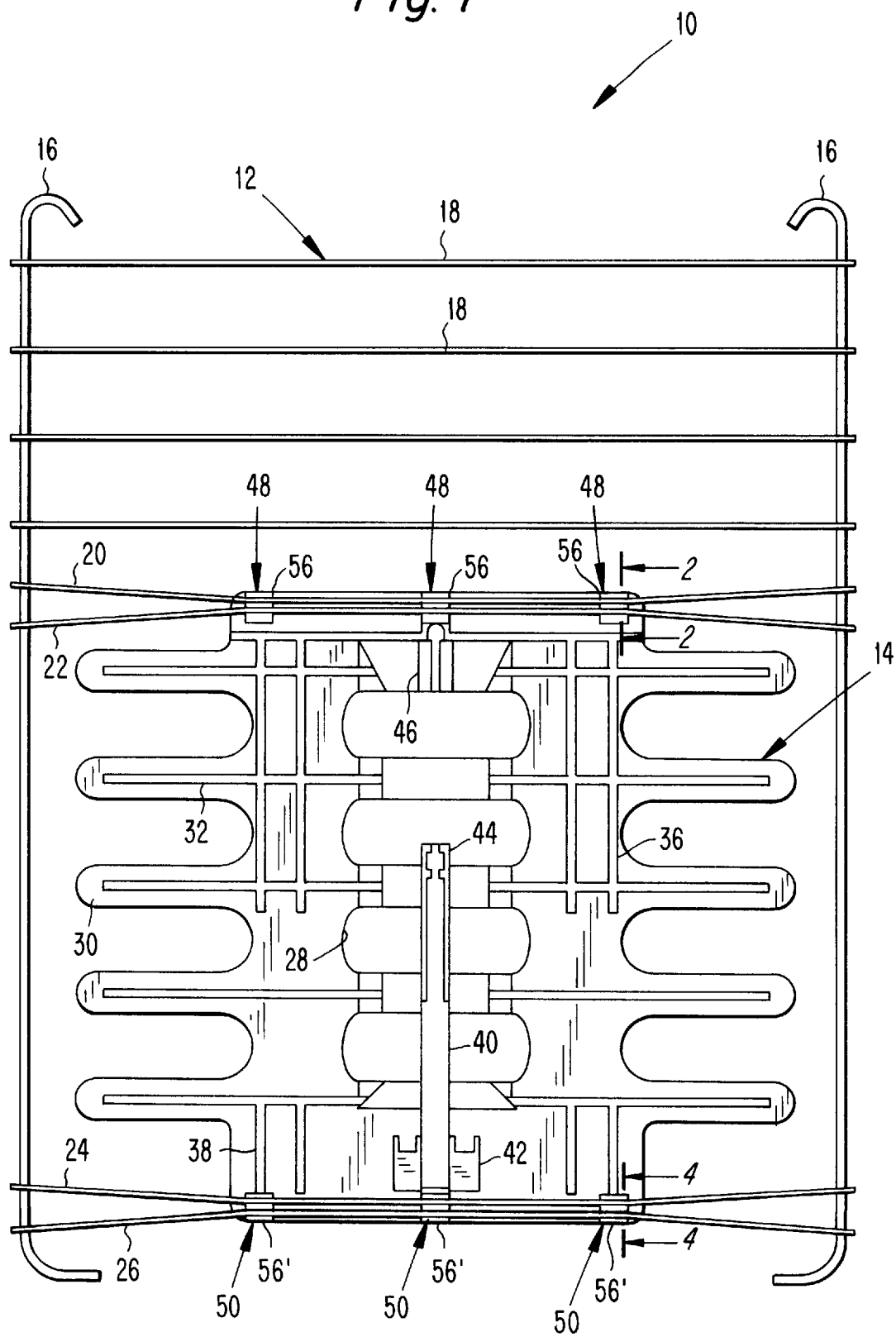
FIG. 1 depicts a rear view of a lordosis support having an interlocking connection according to the present invention.

FIG. 1 shows a lordosis support 10 with a wire grating 12, on which a supporting element 14 is fastened such that it can be detached.

The wire grating 12 is limited on both longitudinal sides by vertical metal rods 16 that are bent on both ends, and which are interconnected by runglike arranged wires 18, 20, 22, 24, 26. Tension springs, which are not shown, are hooked into respective bent ends of both metal rods 16. With these tension springs, the lordosis support 10 is suspended inside the frame of the seat back of a motor vehicle in such a way that the supporting element 14 is positioned approximately in the plane of the seat back upholstery and is facing the back of the user.

The supporting element 14 is an essentially plate-shaped molded plastic part, which has openings 28 in the center and is equipped with horizontally extending fingers 30 along the side edges, and which has as slightly concave shape that is fitted to the body anatomy when seen in horizontal cross-section. Each of these fingers 30 is reinforced on the back by stiffening ribs 32. In the area of the upper and lower ends, there are additional vertical stiffening ribs 36 and 38 provided, while there are no stiffening ribs in the center segment of the supporting element, so that the supporting element can bend elastically.

A lever 40, which is essentially positioned vertically, is arranged in the center of the back of the supporting element 14. At its lower end, the lever is positioned in a bearing 42 mounted on the supporting element such that the lever swivels. The upper end of lever 40 forms an anchoring point 44 for the outside cable of a Bowden pull that is not shown. A Bowden pull is a cable assembly comprised of relatively movable, telescoping cables. An anchoring point 46 for the coordinated inside cable of the Bowden pull is located near the upper edge of supporting element 14. Thus, supporting element 14 can be compressed through stressing in a vertical direction with the aid of the Bowden pull, such that it bends convexly toward the user's back.

The supporting element 14 is fastened to the wire grating 12 at three clamping locations 48 arranged along the upper edge of the supporting element and three clamping locations 50 along the lower edge. At each of the upper clamping locations 48, the supporting element is clamped by clamps 56 to two wires 20, 22 of the wire grating, and at each of the lower clamping locations 50, the supporting element is clamped by clamps 56' to two additional wires 24, 26 of the wire grating.

Figure 2:
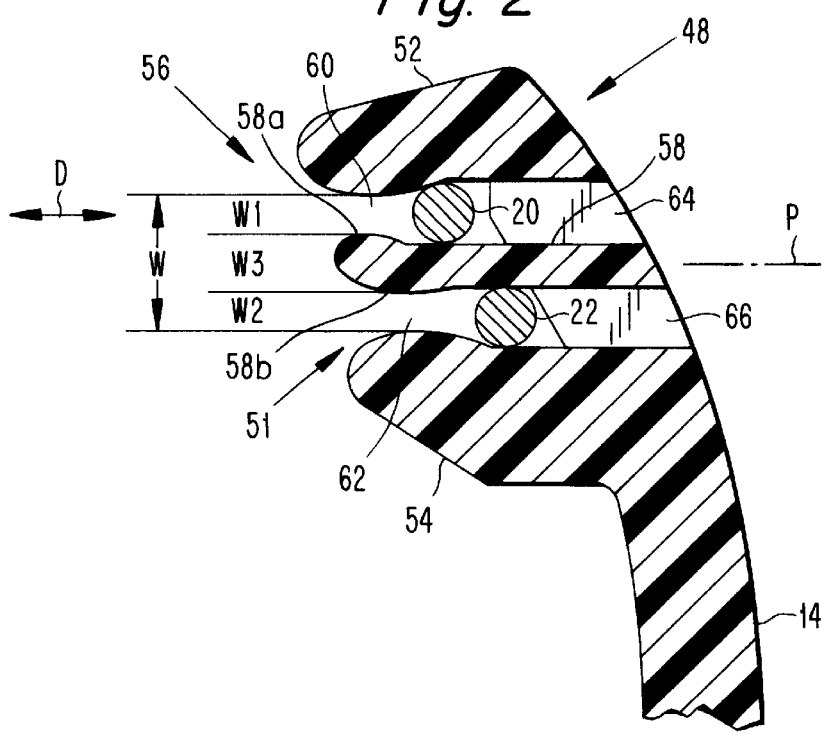
FIG. 2 shows an enlarged section taken along the line 2—2 in FIG. 1.
Figure 4:
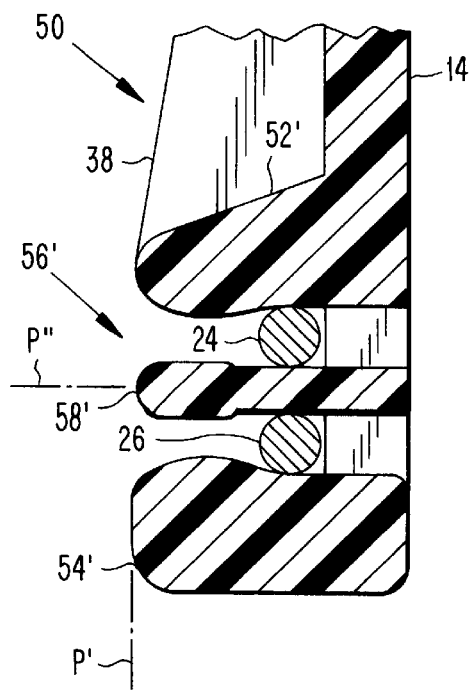
FIG. 4 depicts an enlarged section taken along the line 4—4 in FIG. 1.

The design of clamping locations 48 and 50 is shown in detail in FIGS. 2 and 4.

As can be seen from FIG. 2, the upper edge of the supporting element 14 is rounded slightly toward the back side (i.e., away from the user). At each of the upper clamping locations 48, there are two non-deformable, stiff ribs 52, 54, which run parallel to each other. Those ribs project to the rear of the supporting element and define a clamp 56 having a slot 51 bordered by the ribs 52, 54. Ribs 52, 54 are somewhat thickened on their free end, so that the slot 51 has an opening or mouth of a width W.

The clamp 56 has a middle elastic tongue 58, which extends parallel to the ribs 52, 54 and divides the slot 51 into upper and lower compartments 60, 62, which house the wires 20 and 22, respectively. Tongue 58 is somewhat thickened at its free end. The opening defined by the upper compartment 60 has a width W1 and the opening defined by the lower compartment 62 has a width W2. The effective width or "clear" (unblocked) width of the opening defined by the slot 51 is equal to the width W, less the width W3 of the thickening at the end of tongue 58, and thus has the value W1+W2. This clear width value is smaller than twice the diameter of wires 20, 22 if the diameters are the same. If the two wires have different diameters, then the clear width is smaller than the sum of those two diameters. The wires are insertable and removable in a direction parallel to arrow D which extends perpendicular to the length of the wires. The width W is measured in a direction perpendicular to the direction D.

If a pull is exerted on the supporting element 14 in the direction of arrow D toward the front of this supporting element (i.e., to the right in FIG. 2) while the wire grating 12 is held in place, then the two wires 20 move toward the opening of the slot 51 (i.e., to the left as shown in FIG. 2). The two wires 20 and 22 are compressed by the thickened ends of ribs 52, 54 and push approximately evenly against the tongue 58, so that the tongue cannot move either up or down. As a result, both wires 20 wedge themselves inside the opening of the slot 51, and the support element 14 thus cannot be pulled from the wire grating.

Figure 3:
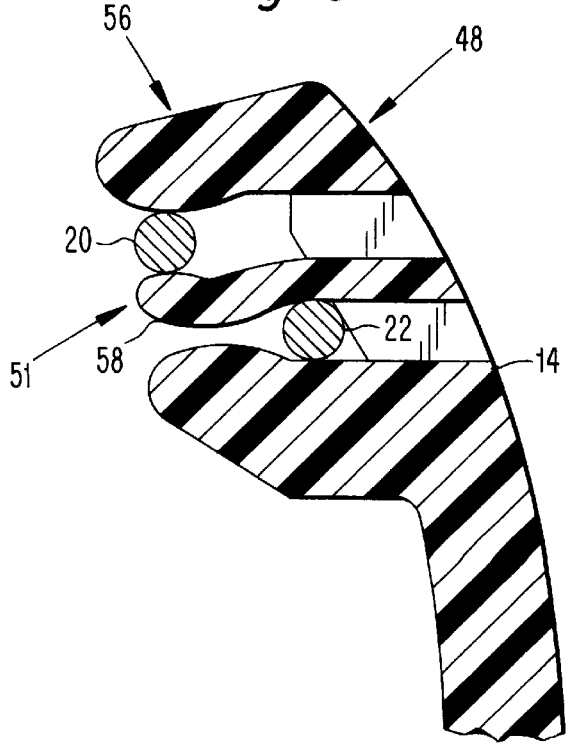
FIG. 3 is a view similar to FIG. 2, but showing the condition during the assembling or detaching of the interlocking connection.

Only if wires 20, 22 are pulled successively from the clamp, as illustrated in FIG. 3, can the tongue 58 flex alternately up or down, so that the wires 20, 22 can leave the respective compartments 60, 62 one after another. In this way, the lock-in connection between supporting element 14 and wire grating 12 can be loosened without problems, if necessary. It is easy to create this lock-in connection during the assembly by pushing the wires one after another into the clamp 56.

So that compartments 60, 62 of the clamp can be removed from the mold during the injection molding of the supporting element 14, supporting element 14 has opening slits 64, 66 on both sides of tongue 58. A stable, onepiece connection between tongue 58 and the other parts of the supporting element 14 is achieved by extending the tongue 58 perpendicularly to the plane of the drawing in FIG. 2, over the ends of slits 64, 66.

The clamp 56 disposed at each of the upper clamping locations 48, the free end of the tongue 58 is not symmetric relative to a horizontal center plane P through the tongue. That is, the upper surface 58a of that free end is spaced farther than the lower surface 58b from the plane P (see FIG. 3). Such a non-symmetric arrangement does not impair the function of the fastening device as long as it is ensured that wires 20, 22 are well wedged in the narrowed opening of the clamp slot. Insofar as the tongue 58 does not bend in the area of its free end, the difference between such spacings can be relatively large. In the example shown, the wedging effect is favored by the fact that tongue 58 has a bead-like thickened free end whose surfaces 58a and 58b face the thickened ends of respective ribs 52, 54.

As shown in FIG. 4, the clamps 56' disposed at the clamping locations 50 along the lower edge of the supporting element 14 have essentially the same design as those disposed at the clamping locations 48, and they are based on the same operational principle. However, the thickened, free ends of ribs 52', 54' and in a common plane P', and the tongue 58', has a thickened free end which is symmetrical about its center plane P". Since the vertical stiffening ribs 38 of the supporting element adjoin the upper ribs 52' of the clamping locations 50, there results a high anti-deforming stiffness of these ribs 52'.

Although the present invention has been described in connection with a preferred embodiment thereof, it will be appreciated by those skilled in the art that additions, deletions, modifications, and substitutions not specifically described may b made without departing from the spirit and scope of the invention as defined in the appended claims.

What is claimed is:

1. In a seat including a wire grating and a support element mounted on wires of said grating; said support element carrying clamps; each clamp including a slot having a mouth which receives two wires of said grating in a direction of wire insertion/removal, said direction extending generally perpendicular to a length of said wires; a clear width of said mouth measured generally perpendicular to said wire length being greater than a diameter of each of said two wires and less than a sum of said diameters of said two wires, to permit sequential insertion and removal of the two wires while preventing simultaneous insertion and removal of said two wires.

2. The apparatus according to claim 1, wherein said clamp further includes a tongue extending generally midway between opposing surfaces of said slot to divide said slot into first and second compartments, said compartments having open mouths formed by respective portions of said mouth of said slot; said tongue being elastic so that a free end of said tongue situated at said mouth of said slot is movable toward either of said opposing surfaces while moving away from the other of said opposing surfaces; said two wires being receivable in respective ones of said compartments; said clear width defined by a distance between said opposing surfaces minus a width of said free end of said tongue.

3. The apparatus according to claim 2, wherein said free end of said tongue constitutes an enlarged portion of said tongue.

4. The apparatus according to claim 2, wherein said clamp includes a pair of parallel stiff ribs forming said opposing surfaces.

5. The apparatus according to claim 4, wherein said free ends of said ribs project slightly toward one another; said free end of said tongue being enlarged toward both of said opposing surfaces.

6. The apparatus according to claim 1, wherein said two wires are clamped in a plurality of said clamps.

7. The apparatus according to claim 6, wherein said wire grating includes a pair of parallel rods to which opposite ends of each of said wires are fixed such that portions of said wires situated between said rods are elastically flexible.

8. The apparatus according to claim 7, wherein said supporting element includes upper and lower edges, each of said edges carrying a plurality of said clamps such that said clamps on said upper edge are clamped to a first pair of said wires, and said clamps on said lower edge are clamped to a second pair of said wires.

9. The apparatus according to claim 8, further including means for pulling said upper and lower edges toward one another for elastically bending a center portion of said supporting element.

10. The apparatus according to claim 1, wherein the supporting element and wire grating are disposed in a back rest of the seat.

* * * * *